Jan. 1, 1929.
G. N. SPIESS
1,697,697
SNOWPLOW
Filed March 6, 1925  3 Sheets-Sheet 1
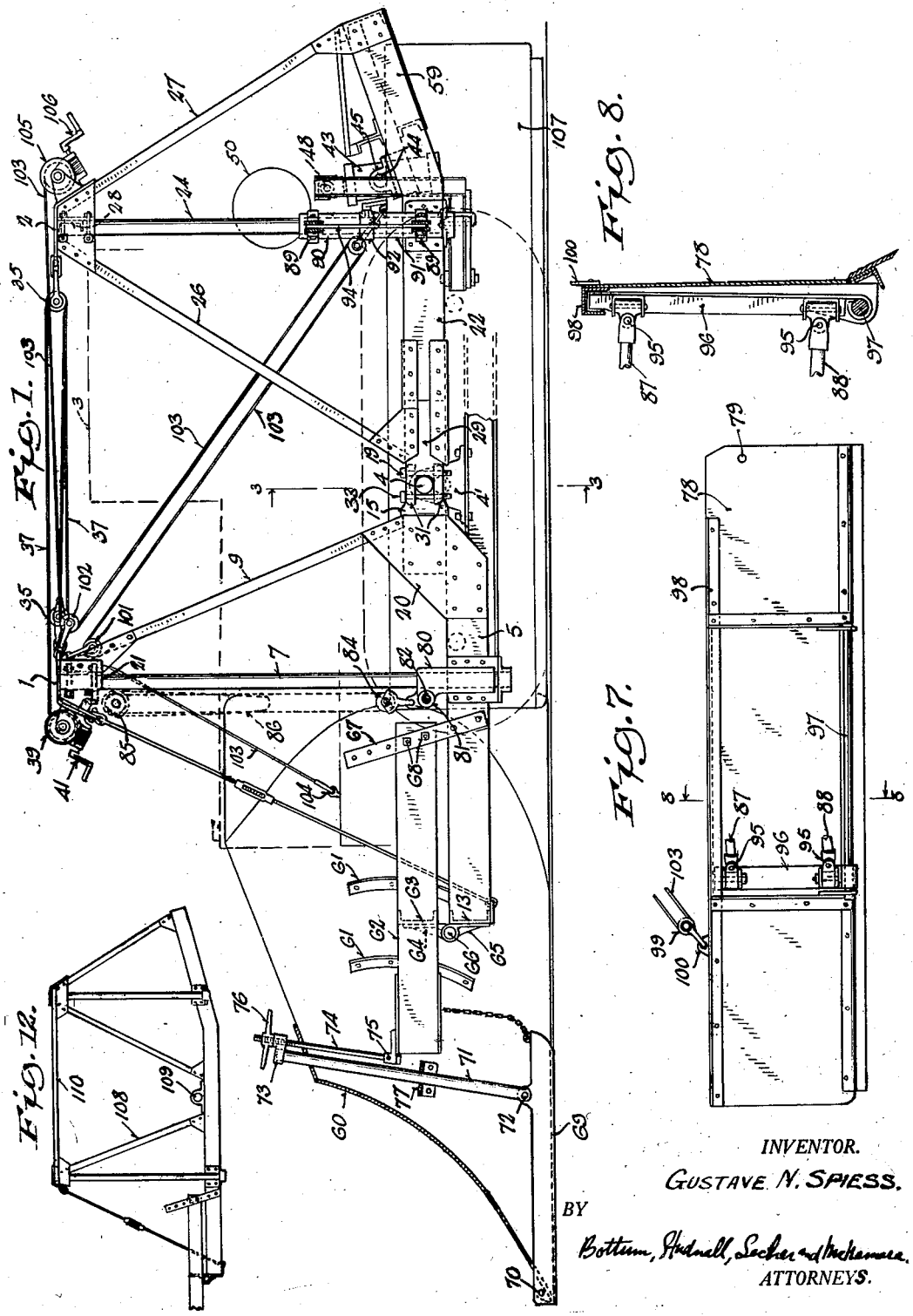
INVENTOR.
GUSTAVE N. SPIESS.
BY
Bottum, Hudnall, Secher and McNamara.
ATTORNEYS.

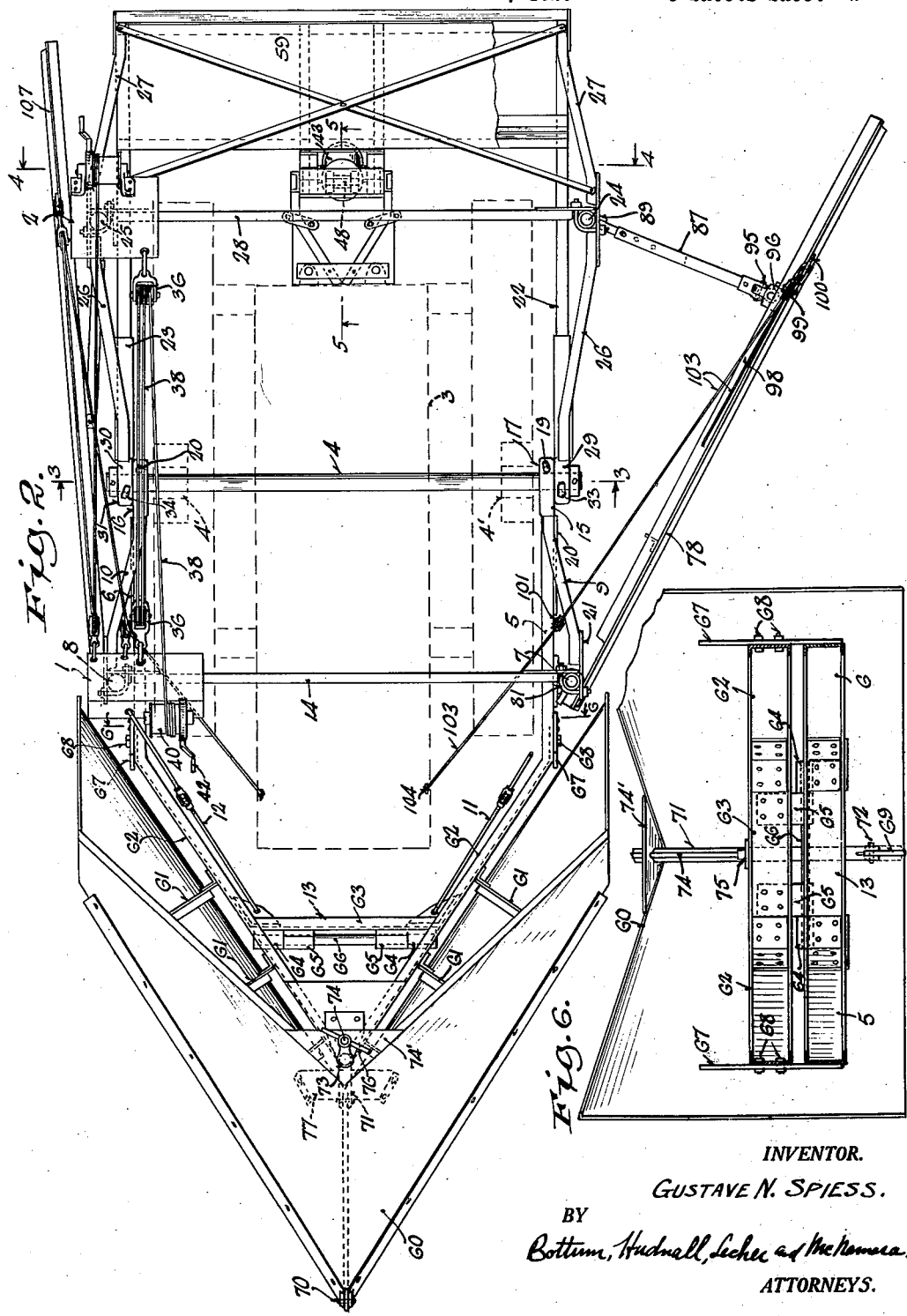

Jan. 1, 1929.  G. N. SPIESS  1,697,697
SNOWPLOW
Filed March 6, 1925     3 Sheets-Sheet 3
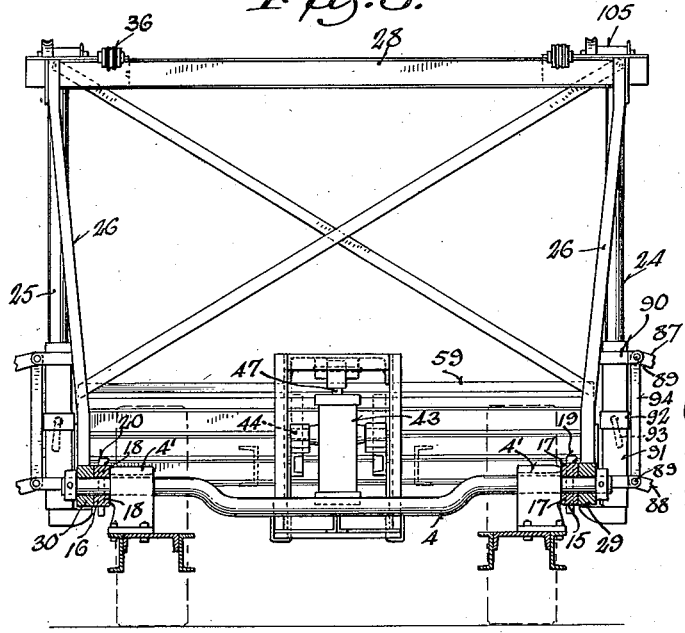
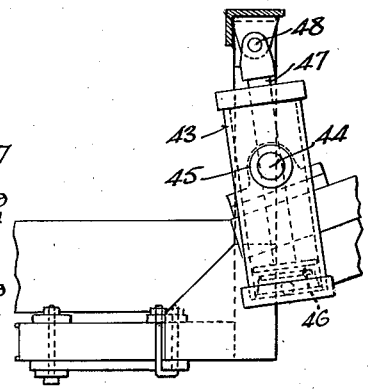
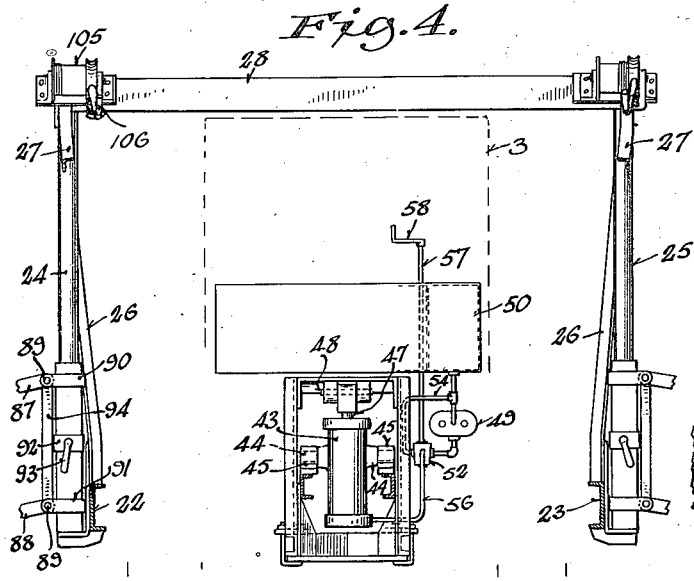
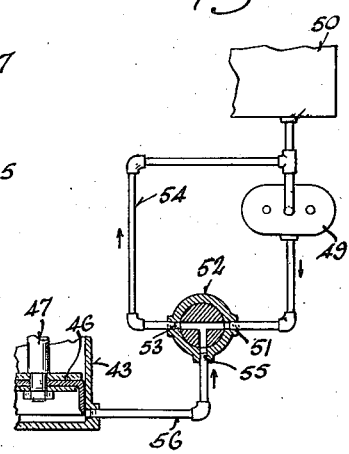
INVENTOR.
GUSTAVE N. SPIESS.
BY
ATTORNEYS.

Patented Jan. 1, 1929.

1,697,697

UNITED STATES PATENT OFFICE.

GUSTAVE N. SPIESS, OF WAUWATOSA, WISCONSIN, ASSIGNOR TO HUNTER MACHINERY COMPANY, OF MILWAUKEE, WISCONSIN, A CORPORATION OF WISCONSIN.

SNOWPLOW.

Application filed March 6, 1925. Serial No. 13,424.

This invention relates to improvements in snowplows and more particularly to snowplows of the type adapted to be propelled by motor vehicles, such as tractors and the like, the invention also contemplating improvements in the manner of connecting such plows to the motor vehicles and means for adjusting the plows with respect thereto.

Plows of the type described have heretofore been supported by the roadway over which they are moved and have been provided with suitable runners for this purpose, the motor vehicle or tractor acting only to push the plow along the roadway through the snow. These plows have been connected to the tractor so that they are supported substantially entirely by their runners upon the roadway. Any supporting action of the tractor upon the plow is negligible in comparison to the great weight of the latter, which, in some instances, is as great as fifteen tons or more. Considerable difficulty has been experienced for this reason, in operating the plow over uneven surfaces or rough roads, and particularly over stretches where there is little or no snow. The great weight of these plows and the fact that they are supported substantially entirely by the roadway has made their use prohibitive in many places where obstacles are present such as ditches and rises in the roadway. The runners, furthermore, imbed themselves in the snow and ice under the great weight of the plow and necessitate backward and forward movement of the tractor to negotiate even a gradual turn, short turns with these plows being, in fact, impossible. Even under ideal conditions, these plows used heretofore have not sufficient flexibility or adjustability of the parts to adapt them to the varying conditions of the snowbanks which always are encountered. In using these snowplows, furthermore, the resistance between the runners and roadway, due to the great weight of the plow, taken with the resistance of the snowbanks against the plow blades or mold boards, frequently causes the endless belts of the tractor to slip with respect to the roadway. This trouble is due to the fact that the weight of the tractor alone is not sufficient under severe conditions to provide the proper bearing pressure between the endless belts thereof and the roadway for causing the machine to drive ahead. Snowplows of the character described are subjected to hard usage, and it is not practical and in fact impossible to make them of lighter construction to eliminate in part the disadvantages above referred to and at the time provide a plow which is efficient, durable and which will properly remove the snow.

One of the objects of the present invention, therefore, is to provide an improved snowplow of the character described which is adapted to be supported substantially entirely by the tractor and is adjustable with respect thereto to meet varying conditions and to increase the bearing pressure between the endless belts of the tractor and the roadway.

Another object is to provide an improved snowplow of the character described which has many advantages over those used heretofore as regards ease of operation, adjustability, durability and efficiency.

Other objects and advantages will hereinafter appear.

For the purpose of illustrating the invention an embodiment thereof is shown in the drawings, in which Figure 1 is a side elevation, some of the parts being removed;

Fig. 2 is a plan view, some of the parts being removed;

Fig. 3 is a section on line 3—3 of Fig. 2;

Fig. 4 is a section on line 4—4 of Fig. 2, some of the parts being broken away;

Fig. 5 is an enlarged section on line 5—5 of Fig. 2;

Fig. 6 is a section on line 6—6 of Fig. 2;

Fig. 7 is a rear elevation of one of the mold boards;

Fig. 8 is a section on line 8—8 of Fig. 7;

Fig. 9 is a diagrammatic view, showing in a general way the connections for controlling the flow of oil to the fluid pressure cylinder for effecting adjustment of the plow with respect to the tractor;

Figs. 10 and 11 are views similar to Fig. 9; and

Fig. 12 is a side elevation, showing a modification.

The frame of the plow may comprise a front frame 1 and a rear frame 2 fitted together around a motor vehicle such as a tractor 3 and connected together for pivotal movement with respect to the tractor about a common axis or shaft 4, the frames and parts connected thereto being substantially in balance so that the center of gravity of the plow is substantially coincident with shaft 4, the shaft being preferably located at the center of the tractor and supported in suitable bearing members or brackets 4'. The front frame 1 may comprise horizontal channel members 5 and 6, vertical struts 7 and 8, diagonal braces 9 and 10, tension rods 11 and 12 connected to the forward converging ends of members 5 and 6, respectively, a channel member 13 connecting these ends, a channel member 14 connected to the upper ends of struts 7 and 8 and braces 9 and 10, as shown, and castings 15 and 16 adapted to fit loosely upon opposite ends of shaft 4 and provided with spaced lugs 17 and 18, respectively, to receive pins 19 and 20 for holding the frame in operative pivotal relation with respect to the shaft.

The various members comprising the front frame 1 may be fabricated in any suitable manner to provide a rigid structure. Plates 20 and 21 may be used to reinforce the frame at the points where the various members thereof meet.

The rear frame 2 may be made substantially like frame 1 and comprises horizontal channel members 22 and 23, vertical struts 24 and 25, diagonal braces 26 and 27, a transverse channel member 28 connecting the upper ends of struts 24 and 25 and braces 26 and 27, and castings 29 and 30 adapted to fit loosely upon opposite ends of shaft 4 and provided with spaced lugs 31 and pins 33 and 34 passing therethrough for holding the frame in operative pivotal relation with respect to the shaft. The frames 1 and 2 are thereby connected to the tractor for pivotal movement or adjustment with respect thereto and also with respect to each other.

For the purpose of connecting frames 1 and 2 together to provide, in effect, a single frame, pulleys 35 and 36 may be pivotally secured to the upper ends of the frames, as shown in Figs. 1 and 2, and connected by means of cables 37 and 38, respectively, an end of each cable being fixed in any suitable manner to one of the pulleys and the other or free ends of the cables being secured to suitable winches 39 and 40, respectively, for winding thereon or unwinding therefrom by means of cranks 41 and 42. From the foregoing it will be seen that the tendency of frames 1 and 2 to rotate in opposite directions about shaft 4 by their own weight will always keep cables 37 and 38 taut and that pivotal movement or adjustment of the frames with respect to each other may be effected by turning cranks 41 and 42 in either direction to pay out or wind up the cables.

For the purpose of causing pivotal movement of frames 1 and 2 as a unit about shaft 4, a fluid pressure cylinder 43 is pivotally supported on trunnions 44 journalled in bearings 45 secured in any suitable manner to frame 2 adjacent the rear end thereof, as more clearly shown in Figs. 1, 2, 4 and 5. The piston 46 of cylinder 43 is provided with a piston rod 47 pivotally connected at 48 in any suitable manner to the rear end of tractor 3 so that upon admission of oil or other fluid under pressure into the lower end of the cylinder, the latter will be forced downwardly and through its connection with frame 2 will cause frames 1 and 2 to rock as a unit in a clockwise direction, as viewed in Fig. 1, about the common axis or shaft 4.

The connections and operating valve for controlling movement of cylinder 43 will now be described, referring more particularly to Figs. 9 and 11. A suitable pump 49 is connected at its inlet end to an oil reservoir 50 and at its outlet or discharge end to the port 51 of the operating valve 52, valve 52 being provided with a port 53 leading back to the inlet side of pump 49 through a by-pass 54 and a port 55 leading to the lower end of the cylinder, as shown. If it is desired to relieve the pressure on the underside of piston 46 and thereby permit the plow frame to rock or swing in a counter-clockwise direction, as viewed in Fig. 1, about shaft 4 and assume its normal horizontal position, valve 52 is moved to the position shown in Fig. 9, to permit any oil below piston 46 to flow back into reservoir 50 through the pipe connection 56 and by-pass 54. In this position of the valve there is a continuous circulation of oil through pump 49 and around by-pass 54, the pump being directly connected in any suitable manner to the motor of the tractor and operated at all times thereby. If it is desired to admit oil under pressure below piston 46 to effect pivotal movement of the plow frame in a clockwise direction and thereby raise the front end of the plow, valve 52 is moved to the position shown in Fig. 10, in which position the flow of oil through the by-pass is cut off and the lower end of cylinder 43 connected to the outlet or high pressure side of the pump. The valve may be held in this position until the plow is moved to the proper angle with respect to the tractor and then moved to the position shown in Fig. 11 to close port 55 and confine or trap the oil in the lower end of the cylinder to hold the plow in adjusted position, by-pass 54 being again connected with the discharge side of pump 49 to permit ready flow of oil through the latter. The valve 52 may be provided with a suitable stem or rod 57 extending upwardly into the cab of the tractor and provided at the end thereof with an actuating handle 58.

For the purpose of locating the center of gravity of the plow slightly forward of shaft 4 to assure pivotal movement thereof in a counter-clockwise direction, as viewed in Fig. 1, when the pressure below piston 46 is relieved, frame 2 may be provided at the rear end thereof with a suitable ballast box 59 within which suitable material such as scrap iron may be placed in sufficient quantity to obtain the desired result, the amount of ballast being of course variable so that the condition of balance may be regulated and controlled as desired. Although there is this slight over-balancing of the plow for the purpose explained above, the plow is supported at substantially the center of gravity thereof, so that only a comparatively slight pressure need be applied to the under side of piston 46 to cause pivotal movement of the plow in a clockwise direction about shaft 4.

The arrangement of and manner of connecting the mold boards to the plow frame will now be described. A V-shaped mold board 60 is secured by any suitable means such as angle members 61 to a similarly shaped frame comprising channel members 62 and a transverse channel member 63 connected thereto, member 63 being pivotally connected to member 13 by any suitable means such as hinge members 64 and 65 connected by a pin 66. A perforated strap 67 may be secured to members 5 and 6, as shown in Figs. 1, 2 and 6 and also connected to channel members 62 of the frame to which mold board 60 is fixed by means of bolts 68 passing through the perforations and registering openings in members 62. It is thereby possible to adjust mold board 60 with respect to frame 1 by swinging the former about pin 66 and holding the same in adjusted position by means of bolts 68 passing through the corresponding perforations in straps 67.

A suitable runner 69 may be pivotally connected at 70 to the point of mold board 60 and adjusted with respect thereto by means of a pipe 71 pivotally connected to the runner at 72 and provided at the upper end thereof with a collar 73 through which a screw threaded rod 74 passes, the latter being pivotally connected at 75 to the front ends of members 62 and having an adjusting nut or wrench 76 threaded thereon for engagement with collar 73. A member 77 provided with an opening through which pipe 71 loosely passes may be connected across mold board 60, as shown in Figs. 1 and 2, to provide an additional support for pipe 71. The pipe 71 and rod 74 pass through and are supported at the upper ends thereof by a plate 74' secured to the upper front edges of the sides of mold board 60. By screwing wrench 76 upon rod 74 pipe 71 is forced downwardly through the opening in member 77 and runner 69 moved about its pivot 70 so that it projects below the lower edges of mold board 60 and prevents direct contact thereof with the roadway. The runner 69 thereby holds the lower edges of mold board 60 in proper spaced relation with respect to the roadway. The pressure between the runner and roadway is only equal to the amount of overbalance of the plow upon shaft 4 referred to above, this pressure being negligible in comparison to the great weight of the entire plow apparatus carried by shaft 4. In other words, for all practical purposes, the entire weight of frames 1 and 2 and apparatus carried thereby is carried by shaft 4, the supporting action of runner 69 being practically negligible as above explained, this element acting primarily as a guide for the front end of the plow and as a means of controlling its position with relation to the roadway.

A side mold board 78 provided with an opening 79 at the forward end thereof is pivotally connected to a sleeve 80 slidably mounted on strut 7 and provided with an apertured lug 81 by means of a bolt 82 passing through opening 79 and the lug. The mold board 78 may thereby be swung in a vertical plane about bolt 82 as a center and swung in a horizontal plane about strut 7. Suitable hoisting tackle comprising pulleys 84 and 85 and a chain 86 may be connected to sleeve 80 and the upper end of strut 7, as shown in Fig. 1, for the purpose of raising and lowering the front end of mold board 78. The mold board 78 may be supported in operative position and held against pivotal movement about strut 7 by means of members 87 and 88 pivotally connected at 89 to sleeves 90 and 91 slidably mounted on strut 24, a ring 92 being also slidably mounted upon the strut and arranged between the sleeves and having a wrench 93 threaded therein for engagement with the strut. The rear ends of members 87 and 88 may thereby be adjusted vertically along strut 24 by sliding sleeves 90 and 91 along the strut and tightening wrench 93. A suitable strap 94 is connected at the ends thereof to sleeves 90 and 91, as shown in Figs. 3 and 4, to prevent relative movement of the latter with respect to each other. The opposite ends of members 87 and 88 are pivotally connected at 95 to a crosshead 96 having the lower end thereof slidably mounted on a rod 97 secured at the ends thereof to mold board 78 in spaced relation with respect thereto, the upper end of the crosshead fitting loosely between the upper edge of the mold board and the vertical flange of an angle member 98 secured thereto. The crosshead 96 may thereby be adjusted longitudinally of the mold board to permit folding thereof against the frame of the plow, as shown in the upper half of Fig. 2. In folding the mold board 78 against the frame of the plow from the position thereof shown in Fig. 2, crosshead 96 is slid longitudinally thereof toward strut 7 and the mold board swung inwardly about the strut at the same time, so that the members 87 and 88 and the mold board are permitted to fold inwardly against the frame.

If the front end of mold board 78 is raised so that the members 87 and 88 swing about their pivots 89 to a position above the horizontal plane, the resultant force of the snow against the mold board will have a vertical component acting upwardly upon the entire machine and tending to turn the same over on its side. To prevent this, wrench 93 is loosened and sleeves 90 and 91 slid upwardly on strut 24 until members 87 and 88 are below the horizontal plane. The vertical component of the force of the snow against the mold board will then act downwardly and tend to hold the machine more firmly upon the road. If mold board 78 is in its lowermost position and the plow swung about shaft 4 in a clockwise direction, as viewed in Fig. 1, the rear end of the mold board will engage the ground if no means are provided to prevent this. A pulley 99 is therefore connected to a suitable ear 100 adjacent the rear end of the mold board and pulleys 101 and 102 connected to the upper end of frame 1, as shown in Fig. 1, and a cable 103 arranged upon the pulleys, as shown, and having an end thereof fixed in any suitable manner at 104 to the tractor frame, the other end of cable 103 being connected to a suitable winch 105 rotated by means of a crank 106. When the plow is swung in a clockwise direction, as viewed in Fig. 1, pulley 101 will be moved away from the fixed point 104 to effect a pull upon cable 103 and cause the rear end of the mold board to be raised a corresponding amount to maintain the same in substantially a horizontal position. The rear end of the mold board may be raised or lowered at any time to swing or adjust the latter in a vertical plane about bolt 82 as a center by turning crank 106 in either direction to wind or unwind cable 103 upon or from winch 105.

The mold board 107 for the other side of the plow is constructed and connected to the frame of the plow in the same manner as explained above in connection with mold board 78 and for that reason no detailed description thereof will be given.

The members 87 and 88 may comprise telescopic parts provided with registering openings to receive pins for holding the same in adjusted relation, as indicated in Fig. 2.

In lieu of a multi-section frame such as previously described, a single rigid frame may be employed, as shown in Fig. 12, for instance, wherein such a frame 108, rigid throughout and extending from end to end of the attachment, is shown pivotally connected at substantially the center of gravity thereof on a shaft 109 similar to shaft 4. In this modification rigid members or truss rods 110 are substituted for the cables 37 and 38. In other respects the plow is constructed in the same manner as shown in Figs. 1 to 11.

It will therefore be seen that a snowplow has been provided which may be pivotally connected to a motor vehicle or tractor and which when so connected is substantially entirely supported thereby, the center of gravity of the plow being substantially at the pivotal connection thereof. The advantage of this construction is that the entire weight of the plow is utilized in increasing the bearing pressure between the endless belts of the tractor and the roadway whereby the traction of the belts with the roadway is greatly increased and slippage thereof prevented even under severe conditions. Great flexibility of operation and adjustability of the various parts all within easy control of the operator are also among the advantages obtained by reason of the construction and arrangement of the parts shown and described.

Snowplows made in accordance with the present invention, furthermore, have no direct contact with the roadway, so that they may be readily swung about within a small compass by proper actuation of the traction belts in well known manner. In this connection it will be understood that the contact of runner 69 with the roadway does not in any way hinder the swinging about or steering of the plow by the tractor for the reason explained above, namely, that the pressure between the runner and roadway is very slight and corresponds in amount to the slight overbalance of the plow on shaft 4. The runner 69 may of course also be raised from the roadway by proper actuation of valve 52 to raise the front end of the plow.

While in the foregoing description the plow has been referred to as a snow plow, it will be appreciated that the invention is in no way limited to the moving of snow. On the other hand, it is of broader adaptation and usefulness and may be advantageously applied to and used for the moving or handling of other substances. For instance, the invention has been applied to advantage and with pronounced success to the moving of earth in the grading and leveling of roads and the like and in other connections where it is desired to move large masses of earth, such as in back filling, and other operations attendant upon or incident to excavation, filling, and grading projects of various kinds. For such purposes a plow element in the form of a scraper plate or blade will be found more suitable than the V-nose plow element used in plowing snow.

Various changes in the size, shape and arrangement of the parts may be adopted without departing from the spirit of the invention or the scope of the claims.

The invention claimed is:

1. In a plow of the character described comprising side frame members, a mold board supported thereby, and means disposed at substantially the center of gravity of said plow for pivotally mounting said members on a motor vehicle in enclosing relationship with respect to the running gear thereof.

2. A plow of the character described comprising frame members, a mold board supported thereby, and means disposed at substantially the center of gravity of said plow for pivotally mounting said members on a motor vehicle in enclosing relationship with respect to the running gear thereof, and means associated with said frame adjacent one end thereof and adapted for cooperation with said vehicle to effect pivotal movement of said plow with respect to the latter.

3. A plow of the character described comprising frame members, a mold board supported thereby, and means disposed at substantially the center of gravity of said plow for pivotally mounting said members on a motor vehicle in enclosing relationship with respect to the running gear thereof, and a fluid pressure cylinder associated with said frame adjacent one end thereof and adapted for cooperation with said vehicle to effect pivotal movement of said plow with respect to the latter.

4. A plow of the character described comprising a frame, a mold board supported thereby, and a second frame, said frames being adapted to be fitted together around a motor vehicle and to be connected thereto for pivotal movement with respect to the same about a common axis, said parts being so arranged that said plow is substantially entirely supported by said vehicle when in operative relation with respect thereto and the center of gravity of the former is substantially at said axis.

5. A plow of the character described comprising a frame, a mold board supported thereby, and a second frame, said frames being adapted to be fitted together around a motor vehicle and to be connected thereto for pivotal movement with respect to the same about a common axis, said parts being so arranged that said plow is substantially entirely supported at substantially the center of gravity thereof, and means associated with said frames and adapted to effect pivotal movement of the same with respect to each other about said axis.

6. In a plow of the character described, a frame, a mold board pivotally connected at one end thereof to said frame for folding against the same, and a member having one end thereof pivotally connected to said mold board and arranged to support the latter in operative relation with respect to said frame, and means pivotally connecting the other end of said member to said frame for vertical adjustment with respect thereto.

7. In a plow of the character described, a frame provided with a vertical strut, a mold board pivotally connected at one end thereof to said frame for folding against the same, and a pair of members having adjacent ends thereof pivotally connected to said mold board and arranged to support the latter in operative relation with respect to said frame, a pair of sleeves pivotally connected to the other ends of said members and slidably mounted on said strut, means connecting said sleeves against relative movement with respect to each other, and means arranged between said sleeves and adapted to engage said strut to hold said sleeves in adjusted position on the latter.

8. In a plow of the character described, a frame provided with means at substantially the center of gravity thereof for pivotally connecting the same to a motor vehicle in such manner that said plow is supported substantially entirely by said vehicle when in operative relation with respect thereto, a V-shape mold board supported at one end of said frame, a mold board connected to said frame at each side thereof and arranged rearwardly of said V-shape mold board, and means associated with said frame and adapted to cooperate with said vehicle to effect pivotal movement of said plow with respect to the latter.

9. The combination with a tractor, of a plow pivotally and substantially entirely supported thereby, said plow comprising a frame completely surrounding said tractor and a mold board secured thereto.

10. The combination with a tractor, of a plow pivotally and substantially entirely supported thereby, said plow comprising a pair of frames fitted together around said tractor and connected together for pivotal movement with respect to each other.

11. The combination with a tractor, of a plow pivotally and substantially entirely supported thereby, said plow comprising a pair of frames fitted together around said tractor and connected together for pivotal movement with respect to each other, a cable connecting said frames and holding the latter in fixed relation with respect to each other, and means associated with said cable and adapted to operate the latter to effect pivotal movement of said frames with respect to each other.

12. The combination with a tractor, of a plow pivotally and substantially entirely supported thereby, said plow comprising a pair of frames fitted together around said tractor and connected together for pivotal movement with respect to each other, each of said frames having a vertical strut at each side thereof, diagonal bracing members associated with said struts, and transverse members connecting the upper ends of said struts and diagonal members.

13. The combination with a tractor, of a plow pivotally and substantially entirely supported thereby, said plow comprising a frame completely surrounding said tractor and a mold board secured thereto, and means associated with said tractor and said plow and adapted and arranged to effect pivotal movement of the latter with respect to said tractor.

14. The combination with a tractor, of a plow pivotally and substantially entirely supported thereby, said plow comprising a frame completely surrounding said tractor and a mold board secured thereto, and a fluid-pressure cylinder associated with said tractor and said plow and adapted and arranged to effect pivotal movement of the latter with respect to said tractor.

15. The combination with a tractor, of a plow pivotally and substantially entirely supported thereby, said plow comprising a frame and a mold board carried thereby for adjustment with respect thereto, and means cooperating with said tractor and said frame and said mold board for maintaining the latter in substantially a horizontal plane during pivotal movement of said plow with respect to said tractor.

16. The combination with a tractor, of a plow pivotally and substantially entirely supported thereby, said plow comprising a frame and a mold board carried thereby for adjustment with respect thereto, and a plurality of pulleys and a cable arranged thereon, said pulleys and cable being associated with said tractor and said frame and said mold board and adapted and arranged to maintain the latter in substantially a horizontal plane during pivotal movement of said plow with respect to said tractor.

17. The combination with a tractor, of a frame completely surrounding said tractor and pivotally supported thereby, a mold board carried by said frame, said parts being so assembled and arranged with respect to said tractor that the center of gravity of the combined weight of the former is substantially coincident with said pivotal mounting.

18. The combination with a tractor, of a frame completely surrounding the same and pivotally supported by said tractor, a mold board carried by the forward portion of said frame in advance of the pivotal mounting thereof on said tractor, and means for counterbalancing the weight of said mold board so as to localize the center of gravity in substantial coincidence with the pivotal connection between said frame and the tractor.

19. The combination with a tractor, of a frame completely surrounding the same and pivotally supported by said tractor, a mold board carried by the forward portion of said frame in advance of the pivotal mounting thereof on said tractor, means for counterbalancing the weight of said mold board so as to localize the center of gravity in substantial coincidence with the pivotal connection of said frame to the tractor, and means for causing said frame to oscillate about said pivotal mounting.

20. The combination with a tractor, of a frame completely surrounding the same and pivotally supported by said tractor, mold boards carried by the forward portion of said frame in advance of the pivotal mounting thereof on said tractor, means for counterbalancing the weight of said mold boards so as to localize the center of gravity of said parts in substantial coincidence with the pivotal connection between the same, and means for causing said frame to oscillate about said pivotal mounting, certain of said mold boards being pivotally mounted on said frame, and means for automatically elevating said last-mentioned mold boards with reference to said frame upon actuation of said oscillating means.

21. The combination with a tractor, of a plow attachment therefor, said attachment comprising two interfitting frames adapted to completely surround the tractor and to be independently pivoted with respect thereto, adjustable means for fastening said frames together so that they may oscillate as a unit with respect to the tractor, and means for causing such oscillation.

22. In a plow, a tractor, a transverse shaft carried thereby and projecting from opposite sides thereof, a plurality of interfitting frames completely surrounding said tractor and pivotally mounted on said shaft, means for relatively adjusting said frames, and means for rocking the said combined frames as a unit on said shaft.

23. In a plow, a tractor, a transverse shaft carried thereby and projecting from opposite sides thereof, a plurality of interfitting frames completely surrounding said tractor and pivotally mounted on said shaft, means for relatively adjusting said frames, means for rocking the said combined frames as a unit on said shaft, mold boards carried by one of said frames, and counterbalancing means carried by the other of said frames.

24. In a plow, a tractor, a transverse shaft carried thereby and projecting from opposite sides thereof, a plurality of interfitting frames completely surrounding said tractor and pivotally mounted on said shaft, means for relatively adjusting said frames, means for rocking the said combined frames as a unit on said shaft, mold boards carried by one of said frames, counterbalancing means carried by the other of said frames, certain of said mold boards being pivotally mounted to said last-mentioned frame, and means for automatically elevating said last-mentioned mold boards with respect to the supporting frame therefor upon oscillation of said combined frames on said shaft.

25. The combination with a tractor, of a frame member completely surrounding the same and pivotally supported by said tractor, mold boards carried by the forward portion of said frame member in advance of the pivotal mounting thereof on said tractor, means for causing said frame member to oscillate about said pivotal mounting, certain of said mold boards being pivotally mounted on said member, and means for automatically elevating said last-mentioned mold boards with reference to said frame member upon actuation of said oscillating means.

26. In a plow, a shaft, and supports therefor, a plurality of oppositely directed frames pivotally mounted on said shaft, and means for tying said frames together so that they may be adjusted on said shaft as a unit.

27. In a plow, a shaft, and supports therefor, a plurality of oppositely directed frames pivotally mounted on said shaft, and means for tying said frames together so that they may be adjusted on said shaft as a unit, said tying means being adjustable for adjusting said frames relatively to each other.

28. In a plow, a shaft, and supports therefor, a plurality of oppositely directed frames pivotally mounted on said shaft, and means for tying said frames together so that they may be adjusted on said shaft as a unit, and means for so adjusting said frames.

29. In a plow, a shaft, and supports therefor, a plurality of oppositely directed frames pivotally mounted on said shaft, and means for tying said frames together so that they may be adjusted on said shaft as a unit, the center of gravity of said combined frames when so tied together being substantially coincident with the axis of said shaft.

30. In a plow, a tractor, a shaft carried by said tractor and arranged transversely and substantially centrally thereof, a frame surrounding said tractor and mounted on said shaft for swinging adjustment with respect to said tractor, and means for adjusting said frame.

31. The combination with a tractor, of a frame completely surrounding the same and pivotally supported on said tractor, a mold board carried by the forward portion of said frame in advance of the pivotal mounting thereof, and means for causing said frame to oscillate about said pivotal mounting.

32. In a plow, a tractor, a frame surrounding said tractor and pivotally connected thereto for adjustment about a horizontal axis fixed relatively with respect to the tractor and disposed substantially centrally of the same, a plow member carried by said frame in advance of said axis, and means for adjusting said frame.

33. In apparatus of the character described, a tractor, a frame surrounding the same, a plow member carried by said frame, and means connecting said frame to said tractor for bodily swinging movement with respect thereto.

34. In apparatus of the character described, a tractor, a frame surrounding the same, a plow member carried by said frame, means connecting said frame to said tractor for bodily movement with respect thereto, and means for imparting such movement to said frame.

35. In apparatus of the character described, a tractor provided with bearings projecting laterally from the sides thereof, a frame surrounding said tractor and mounted on said bearings for bodily swinging movement with respect to said tractor, and a plow member carried by said frame.

36. The combination with a tractor, of an overbalanced structure surrounding said tractor and pivotally supported thereby, said structure including a plow member disposed at the heavier end thereof and normally held in operative position by gravity.

37. The combination with a tractor, of an overbalanced structure surrounding said tractor and pivotally supported thereby, said structure including a plow member disposed at the heavier end thereof and normally held in operative position by gravity, and means cooperating with said structure for swingingly adjusting the same about its pivotal support.

38. The combination with a tractor, of a shaft extending transversely and substantially centrally thereof and terminating beyond the traction elements of said tractor, a frame comprised of side members pivotally mounted on the ends of said shaft beyond and enclosing said traction elements and connected across the front of said tractor, a plow member attached to the front of said frame, and means for adjusting said frame with respect to said tractor.

39. The combination with a tractor, of a shaft extending transversely and substantially centrally thereof and terminating beyond the traction elements of said tractor, a frame comprised of side members pivotally mounted on the ends of said shaft beyond and enclosing said traction elements and connected across the front of said tractor, a plow member attached to the front of said frame, and means for adjusting said frame with respect to said tractor, said means being arranged to co-act with the rear end of said frame.

40. The combination with a tractor, of a shaft extending transversely and substantially centrally thereof through and beyond the traction elements of said tractor, a frame comprised of side members pivotally mounted on the ends of said shaft beyond said traction elements, a plow member mounted across the front of said frame, and means for adjusting said frame with respect to said tractor.

41. Combined with a tractor of the traction belt type, an enclosing frame pivoted to swing up and down midway of the tractor, a plow element attached to the front end of the frame, and means connecting with the tractor at the rear to depress the rear end of the frame and elevate the plow element.

42. Combined with a tractor of the traction belt type, a surrounding frame provided with a plow element at its front end, an axle carried midway of and by the tractor frame, said surrounding frame being rockably supported on said axle, and means disposed at the rear of the tractor to elevate the plow element by depressing the rear end of the surrounding frame.

43. Combined with a tractor of the traction belt type, a surrounding frame, an offset axle crossing the tractor and surrounding frame midway and supporting the latter on the tractor pivotally, a plow element at the front end of said frame, and a shoe carried by said frame to limit the digging movement of the plow element.

44. Combined with a tractor of the traction belt type, an enclosing frame carrying a plow element at the front end, and an offset axle crossing the tractor and frame midway and supporting the latter on the tractor pivotally.

45. Combined with a tractor of the traction belt type, an enclosing frame carrying a plow element at the front end, a pivotal support for said frame midway of the frame and tractor, and a hydraulic jack disposed at the rear of the tractor to elevate the plow element by depressing the rear of its frame.

46. Combined with a traction belt tractor having a tractor driven force pump and oil supply, an enclosing frame carrying a plow element at the front end, a midway pivotal connection of the frame with the tractor, a thrust-yoke connecting with the rear end of the tractor, and a hydraulic jack in operative connection with said yoke, frame and force pump.

47. Combined with a tractor having a tractor driven force pump and oil supply, an enclosing frame carrying a plow element at its front end, a pivotal mount for the same midway of the tractor, a hydraulic jack in operative connection with the rear end of the frame and the rear of the tractor, a piping system in operative connection with said oil supply and jack, and a three-way valve in said piping system positioned near the driver's seat of the tractor and provided with an operating lever.

In witness whereof I hereto affix my signature.

GUSTAVE N. SPIESS.